United States Patent
Bower et al.

(10) Patent No.: US 6,277,318 B1
(45) Date of Patent: Aug. 21, 2001

(54) METHOD FOR FABRICATION OF PATTERNED CARBON NANOTUBE FILMS

(75) Inventors: Christopher Andrew Bower; Otto Zhou, both of Chapel Hill, NC (US); Wei Zhu, Warren, NJ (US)

(73) Assignees: Agere Systems Guardian Corp., Orlando, FL (US); University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 09/376,457

(22) Filed: Aug. 18, 1999

(51) Int. Cl.[7] .................................................. B29B 17/00
(52) U.S. Cl. .................. 264/346; 264/446; 264/235; 264/236; 264/298; 264/3.9; 264/345; 428/206
(58) Field of Search .................... 313/346, 495; 264/446, 636, 235, 236, 346, 298, 299, 319, 336, 345, 348

(56) References Cited

U.S. PATENT DOCUMENTS 5,773,921 * 6/1998 Kessmann et al. .................. 313/309
5,872,422 * 2/1999 Xu et al. ............................. 313/311

FOREIGN PATENT DOCUMENTS

WO 98 11588  3/1998 (WO).

OTHER PUBLICATIONS

Fan, S. et al., "Self–Oriented Regular Arrays of Carbon Nanotubes and their Field Emission Properties", *Science*, vol. 283, p. 512 (1999).

Xu et al., "A Method for Fabricating Large–Area, Patterned, carbon Nanotube Field Emitters", *Appl. Phys. Lett.*, vol. 74, p. 2549 (1999).

Iijima, S., *Nature*, vol. 354, p. 56 (1991).

Ebbesen, T. W. et al., *Nature*, vol. 358, p. 220 (1992).

Yakobson, B. I. *American Scientists*, vol. 85, p. 324 (1997).

Fan et al., *Science*, vol. 283, p. 512 (1999).

Xu et al., *Appl. Phys. Lett.*, vol. 74, p. 2549 (1999).

Massalski, T. B. *Binary Alloy Phase Diagrams*, vol. I, ASM International.

Shelimov, K. B. et al., "Purification of Single Wall Nanotubes by Ultrasonically Assisted Filtration", *Chem. Phys. Lett.*, vol. 282, p. 429 (1998).

U.S. Patent application Serial No. 09/296572, filed on Apr. 22, 1999.

U.S. Patent application Serial No. 09/351537, filed on Jul. 12, 1999.

\* cited by examiner

Primary Examiner—Merrick Dixon
(74) *Attorney, Agent, or Firm*—Scott J. Rittman

(57) ABSTRACT

A method for fabricating adherent, patterned carbon nanotube films is provided. According to the invention, a substrate is patterned with a carbide-forming material, a carbon-dissolving material, or a low melting point metal. Carbon nanotubes are then deposited onto the patterned substrate, but have relatively poor adhesion to either the substrate material or the patterned material. The substrate is then annealed, typically in vacuum, at a temperature dependent on the particular patterning material, e.g., a temperature at which carbide formation occurs, at which carbon dissolution occurs, or at which the low melting point metal melts. The annealing thereby provides an adherent nanotube film over the patterned areas, while the nanotubes deposited onto the non-patterned areas are easily removed, e.g., by blowing, rubbing, brushing and/or ultrasonication in a solvent such as methanol.

9 Claims, 2 Drawing Sheets

METHOD FOR FABRICATION OF PATTERNED CARBON NANOTUBE FILMS

BACKGROUND OF THE INVENTION

1. Field of the Invention

The invention relates to devices comprising carbon nanotube films.

2. Discussion of the Related Art

Carbon nanotubes have interesting electronic properties and offer potential for use in electronic devices and in interconnect applications. Carbon nanotubes also feature high aspect ratios (>1000) and atomically sharp tips which make them ideal candidates for electron field emitters. To realize these potential applications, there is a need to process nanotubes into useful forms such as thin films, and, advantageously, patterned thin films.

Carbon nanotubes are currently being produced by a variety of different techniques such as arc-discharge, laser ablation and chemical vapor deposition (CVD). (See S. Iijima, *Nature*, Vol. 354, p. 56 (1991); T. W. Ebbesen and P. M. Ajayan, *Nature*, Vol. 358, p. 220 (1992); and B. I. Yakobson and R. E. Smalley, *American Scientists*, Vol. 85, p. 324 (1997). The as-deposited material, however, is usually in the form of loose powders, porous mats, or films with poor adhesion. These forms of nanotubes do not lend themselves to convenient preparation of robust adherent nanotube thin film structures. The difficulty in preparing an adherent film of nanotubes is believed to be due to the perfect structure associated with carbon nanotubes, which contain essentially no dangling bonds and few defect sites. As a result, nanotube films tend to exhibit poor adhesion, even to the point of being easily removed by contact or by air flow (e.g., an air duster).

Patterned nanotube films have been reported by Fan et al., *Science*, Vol. 283, p. 512 (1999), and Xu et al., *Appl. Phys. Lett.*, Vol. 74, p. 2549 (1999). These references describe use of direct deposition techniques such as CVD, in which substrates are selectively patterned with catalyst metals and then nanotubes are grown in the patterned areas. These techniques, however, produce films with poor adhesion. The techniques also expose the substrates to a reactive and high-temperature deposition environment, which is both inconvenient and harmful to actual device structures. In addition, the techniques are limited to the patterned growth of multi-wall carbon nanotubes (MWNTs), because CVD typically produce MWNTs on catalytic substrates.

Thus, there is a desire to develop more convenient and versatile methods for patterning carbon nanotube films with adequate adhesion, to allow formation of more useful and robust device structures.

SUMMARY OF THE INVENTION

The invention provides a method for fabricating adherent, patterned carbon nanotube films. (Adherent indicates that the adhesion strength of the film exceeds scale 2A or 2B according to ASTM tape testing method D3359-97.) According to the invention, a substrate is patterned with a carbide-forming material, a carbon-dissolving material, or a low melting point metal (i.e., about 700° C. or less). Carbon nanotubes are then deposited onto the patterned substrate, e.g., by spraying or suspension casting. The nanotubes have relatively poor adhesion to either the substrate material or the patterned material at this stage. The substrate is then annealed, typically in vacuum, at a temperature dependent on the particular patterning material, e.g., a temperature at which carbide formation occurs, at which carbon dissolution occurs, or at which the low melting point metal melts. The annealing thereby provides an adherent nanotube film over the patterned areas, while the nanotubes deposited onto the non-patterned areas are easily removed, e.g., by blowing, rubbing, brushing, or ultrasonication in a solvent such as methanol. This process provides an adherent nanotube film in a desired pattern. The patterned films are useful for a variety of devices, including vacuum microelectronic devices such as flat panel displays, as well as other structures, e.g., nanotube interconnects.

DETAILED DESCRIPTION OF THE INVENTION

The invention provides a process for fabricating patterned, adherent carbon nanotube films. One embodiment of the process is shown in FIGS. 1A–1D. Related discussion of adherent nanotube films can be found in U.S. patent application Ser. No. 09/296,572 (our reference Bower 1-1-37), the disclosure of which is hereby incorporated by reference.

A flat substrate 10 is first provided. The substrate 10 should be substantially non-reactive with carbon, e.g., not carbide-forming or carbon-dissolving, and should also have a relatively high melting point, typically at least 1000° C. Examples include $SiO_2$ (including Si wafers having an oxidized surface layer), indium tin oxide (ITO), $Al_2O_3$, Cu, and Pt.

Figure 1A:
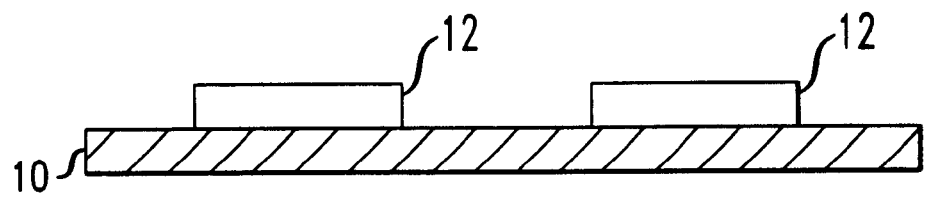
FIGS. 1A–1D illustrate the process of the invention.

As reflected in FIG. 1A, a material 12 is deposited onto the substrate 10 in a pattern desired for the nanotube film. The patterning material 12 is selected from (a) carbon-dissolving materials, (b) carbide-forming materials, and (c) low melting point (about 700° C. or less) metals. Carbon-dissolving materials are known in the art, as reflected, for example in T. B. Massalski, *Binary Alloy Phase Diagrams*, Vol. I, ASM International, and include elements such as Ni, Fe, Co, and Mn. Carbide-forming elements are similarly known in the art, as reflected in Massalski, supra, and include elements such as Si, Mo, Ti, Ta, W, Nb, Zr, V, Cr, and Hf. Typical low melting point metals include Al, Sn, Cd, Zn, and Bi. The thickness of the patterning material 12 is typically 10 to 100 nm. The patterning material is deposited by any suitable technique, e.g., sputtering, evaporation, or chemical vapor deposition. Conventional lithographic processes are generally used to provide the desired pattern.

Figure 1B:
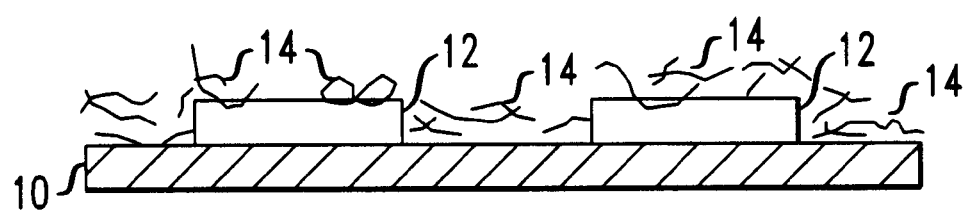

Carbon nanotubes 14 are then deposited onto the patterned substrate 10, as reflected in FIG. 1B. (Only a few nanotubes are shown, for representative purposes, in the drawing—in practice, nanotube coverage would be much more dense.) The nanotubes are typically deposited by suspension casting or spray coating. Suspension casting is generally performed by placing the substrate into a nanotube suspension made up of nanotubes and a solvent such as methanol, and allowing the solvent to evaporate. Spray coating is performed by spraying such a suspension onto the substrate (which is typically heated) using an air gun, and allowing the solvent to evaporate. Both methods tend to provide relatively uniform thin films of randomly oriented nanotubes.

Figure 1C:
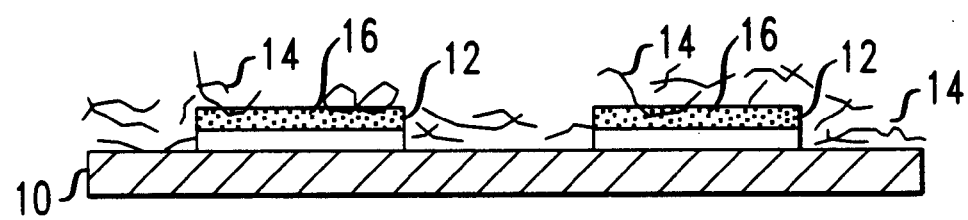
Figure 1D:
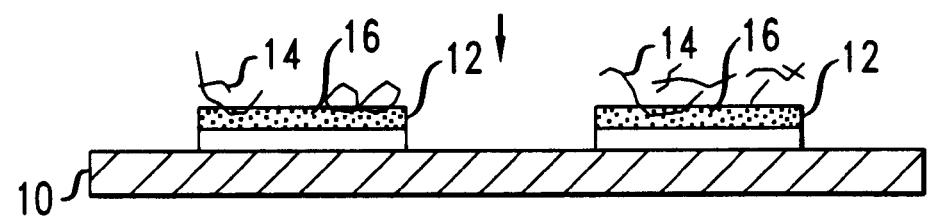

As reflected in FIG. 1C, the substrate 10 is then annealed, generally in vacuum ($10^{-6}$ torr or less). The temperature of the anneal is selected based on the patterning material 12. Specifically, the temperature is chosen to promote carbon dissolution, carbide formation, or melting of the patterning material 12. The anneal is generally performed 30 minutes to 24 hours, depending on the particular patterning material. By inducing carbon dissolution, carbide formation or melting at the areas where the nanotubes 14 contact the patterning material 12, an area 16 of enhanced adherence between the nanotubes 14 and patterning material 12 is created. Specifically, for carbide-forming material, a carbide is formed by reaction of the material and at least a portion of the nanotubes. For carbon-dissolving material, a metal-carbon solid solution is formed by reaction of the material and at least a portion of the nanotubes. And for low melting point metals, at least a portion of the nanotubes become physically embedded in a molten metal layer and then held in place upon cooling. reflected in FIG. 1D, the nanotubes deposited directly on the substrate 10 material are removed after annealing. Because the nanotubes have relatively poor adherence to the substrate 10 material, removal is relatively easy. Removal is capable of being performed by blowing, rubbing, or brushing the surface of the substrate 10, or by ultrasonication in a solvent such as methanol. It is possible to combine these techniques. Typically, the substrate is ultrasonicated without blowing, rubbing, or brushing. Ultrasonication, when performed without any other removal technique, is generally performed for 0.5 to 24 hours.

The thickness of the resultant adherent, patterned nanotube film is generally 100 to 1000 nm. The adhesion strength of the resultant patterned nanotube films is sufficient to exceed the 2A or 2B scale in the ASTM tape test D3359-97.

The patterned nanotube films are useful in a variety of applications, including vacuum microelectronic devices such as flat panel displays, as well as novel applications such as interconnects in silicon-based devices.

The invention will be further clarified by the following examples, which are intended to be exemplary.

EXAMPLE 1

Figure 2:
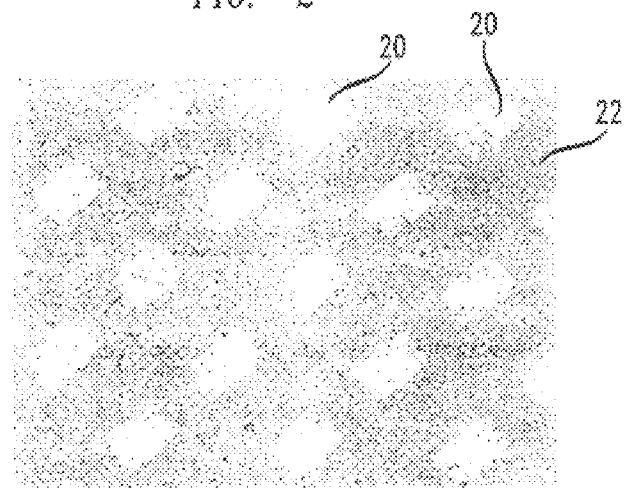
FIG. 2 is an optical micrograph of a patterned nanotube film fabricated according to the invention.

A silicon substrate with an oxidized surface was provided. Al pads having an area of 100×70 $\mu$m and a thickness of 50 nm were patterned onto the substrate surface by thermal evaporation, using a shadow mask. Single wall carbon nanotubes were obtained. The nanotubes had been fabricated by laser ablation with bundle diameters of 10 to 30 nm and lengths of 2 to 10 $\mu$m, and were then purified using an ultrasonically assisted filtration technique (see, e.g., K. B. Shelimov et al., "Purification of Single Wall Nanotubes by Ultrasonically Assisted Filtration," *Chem. Phys. Lett.*, Vol. 282, p. 429 (1998)). The nanotubes were deposited onto the patterned substrate by spraying. The substrate was then vacuum annealed at 700° C. for 30 minutes (the melting point of Al is about 660° C.), and ultrasonicated in for two hours. The resulting patterned nanotube film is shown in FIG. 2, with coated pads 20, and uncoated substrate surface 22.

EXAMPLE 2

Figure 3A:
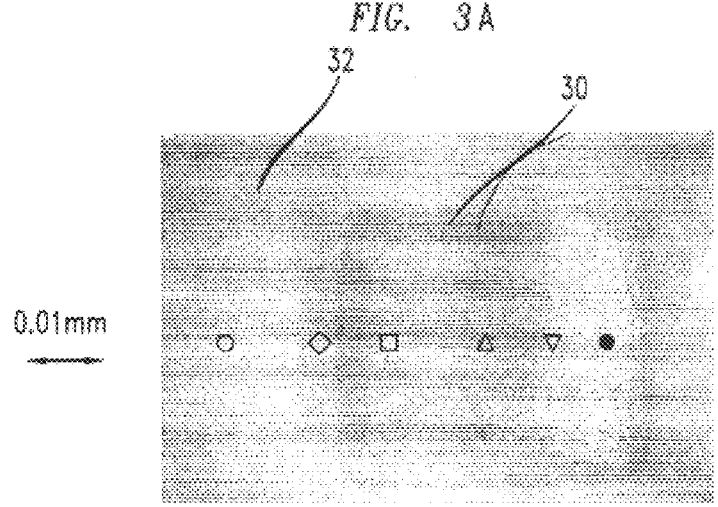
FIGS. 3A and 3B reflect Raman spectroscopy data indicating the patterned nature of nanotube films fabricated according to the invention.

A silicon substrate with an oxidized surface was provided. Fe pads having an area of 70×70 $\mu$m and a thickness of 20 nm were patterned onto the substrate surface by sputtering, using a shadow mask. Single wall carbon nanotubes were obtained as in Example 1. The nanotubes were deposited onto the patterned substrate by spraying. The substrate was then vacuum annealed at 800° C. for 30 minutes, and ultrasonicated in methanol for 2 hours. A portion of the resulting structure—coated Fe pad 30 and uncoated substrate surface 32—is shown in FIG. 3A.

Figure 3B:
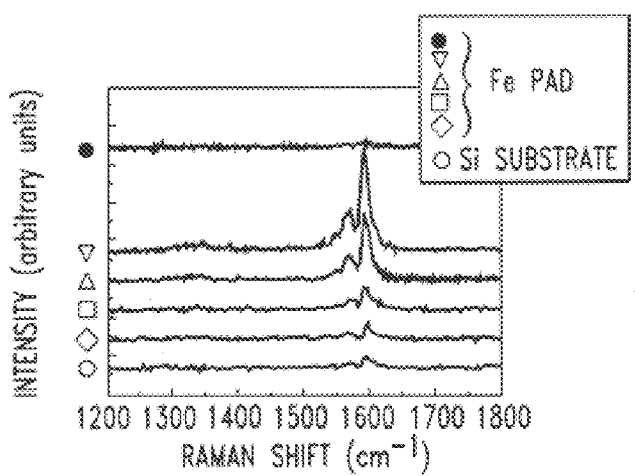

To confirm that the nanotubes remained intact after the annealing and ultrasonication, Raman spectroscopy was performed. The graphitic carbon-carbon vibration mode at about 1580 $cm^{-1}$ is indicative of the presence of the nanotube structure. As shown by the Raman spectroscopy results in FIG. 3B, the spectra taken over the Fe pad show nanotubes, while the spectra off the pad indicates the absence of nanotubes.

Other embodiments of the invention will be apparent to those skilled in the art from consideration of the specification and practice of the invention disclosed herein.

What is claimed is:

1. A process for fabricating a patterned, adherent carbon nanotube film, comprising the steps of:

providing a substrate;

providing a patterned material on the substrate, the material being selected from the group consisting of carbon-dissolving materials, carbide-forming materials, and low melting point metals;

depositing pre-formed carbon nanotubes onto the substrate;

annealing the substrate to promote adherence of the nanotubes to the patterned material; and removing at least a portion of the nanotubes located on the non-patterned area of the substrate.

2. The process of claim 1, wherein the substrate material is selected from the group consisting of $SiO_2$, indium tin oxide, $Al_2O_3$, Cu, and Pt.

3. The process of claim 1, wherein the removing step is performed by at least one technique selected from the group consisting of blowing, brushing, rubbing, and ultrasonicating.

4. The process of claim 1, wherein the carbon-dissolving materials are selected from the group consisting of Ni, Fe, Co, and Mn, wherein the carbide-forming elements are selected from the group consisting of Si, Mo, Ti, Ta, W, Nb, Zr, V, Cr, and Hf, and wherein the low melting point metals are selected from the group consisting of Al, Sn, Cd, Zn, and Bi.

5. The process of claim 1, wherein the annealing is performed at a temperature sufficient to attain an effect selected from the group consisting of reaction of at least portion of the nanotubes with the carbon-dissolving material, reaction of at least a portion of the nanotubes with the carbide-forming material, and melting of at least a portion of the low melting point metals.

6. The process of claim 1, wherein the nanotubes are deposited on the substrate by suspension casting or spraying.

7. A device comprising:

a substrate;

a patterned material on the substrate; and an adherent carbon nanotube film located on the patterned material, the film comprising pre-formed nanotubes adhered to the pattern material, wherein the patterned material is a carbon-dissolving material and a carbon-containing solid solution adheres to nanotubes to the patterned material, or the patterned material is a carbide-forming material and a carbide adheres the nanotubes to the patterned material, or the patterned material is a low melting point metal and at least a portion of the nanotubes are physically embedded in the patterned material.

8. The device of claim 7, wherein the carbon-dissolving materials are selected from the group consisting of Ni, Fe, Co, and Mn, wherein the carbide-forming elements are selected from the group consisting of Si, Mo, Ti, Ta, W, Nb, Zr, V, Cr, and Hf, and wherein the low melting point metals are selected from the group consisting of Al, Sn, Cd, Zn, and Bi.

9. The device of claim 7, wherein the nanotubes are single wall nanotubes.

* * * * *

UNITED STATES PATENT AND TRADEMARK OFFICE
CERTIFICATE OF CORRECTION

PATENT NO. : 6,277,318 B1  
DATED : August 21, 2001  
INVENTOR(S) : Christopher Andrew Bower, Otto Zhou and Wei Zhu Page 1 of 1

It is certified that error appears in the above-identified patent and that said Letters Patent is hereby corrected as shown below:

<u>Column 1,</u>  
Line 3, insert the following sentence:  
-- The U.S. government may have rights in this invention pursuant to Grant No. N00014-98-1-0597 awarded by the Office of Naval Research. --.

Signed and Sealed this

Sixteenth Day of April, 2002

*Attest:*

JAMES E. ROGAN  
*Attesting Officer*     *Director of the United States Patent and Trademark Office*